June 3, 1930.  G. SOYLIAN  1,762,035
REVOLVING BROILER
Filed May 28, 1928  2 Sheets-Sheet 2
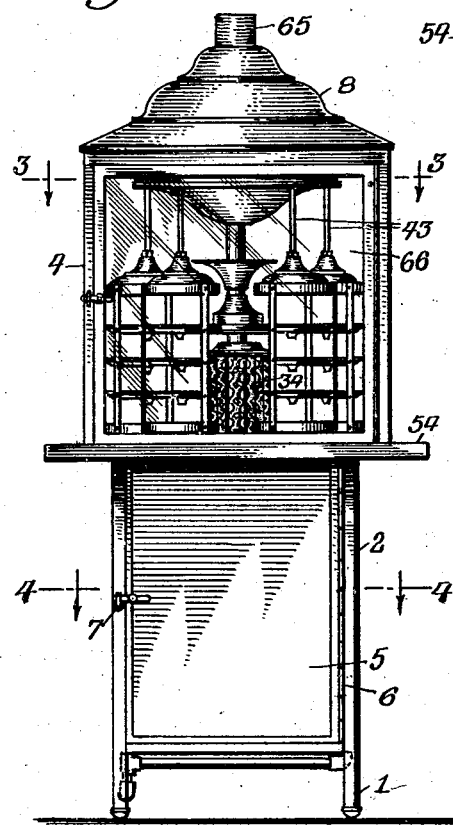
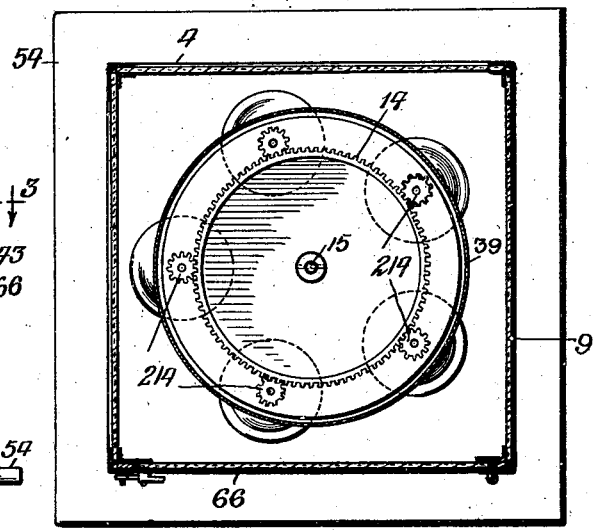
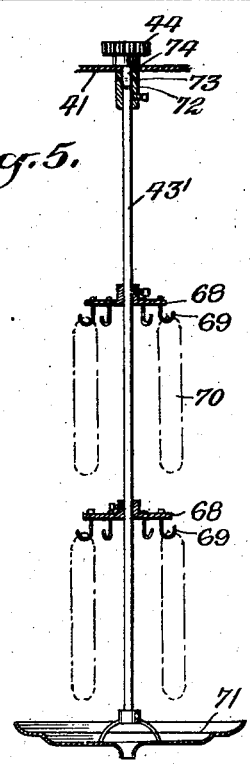
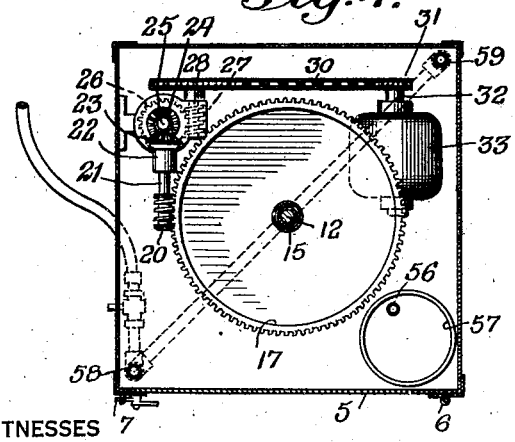
INVENTOR
George Soylian
BY
ATTORNEYS Patented June 3, 1930

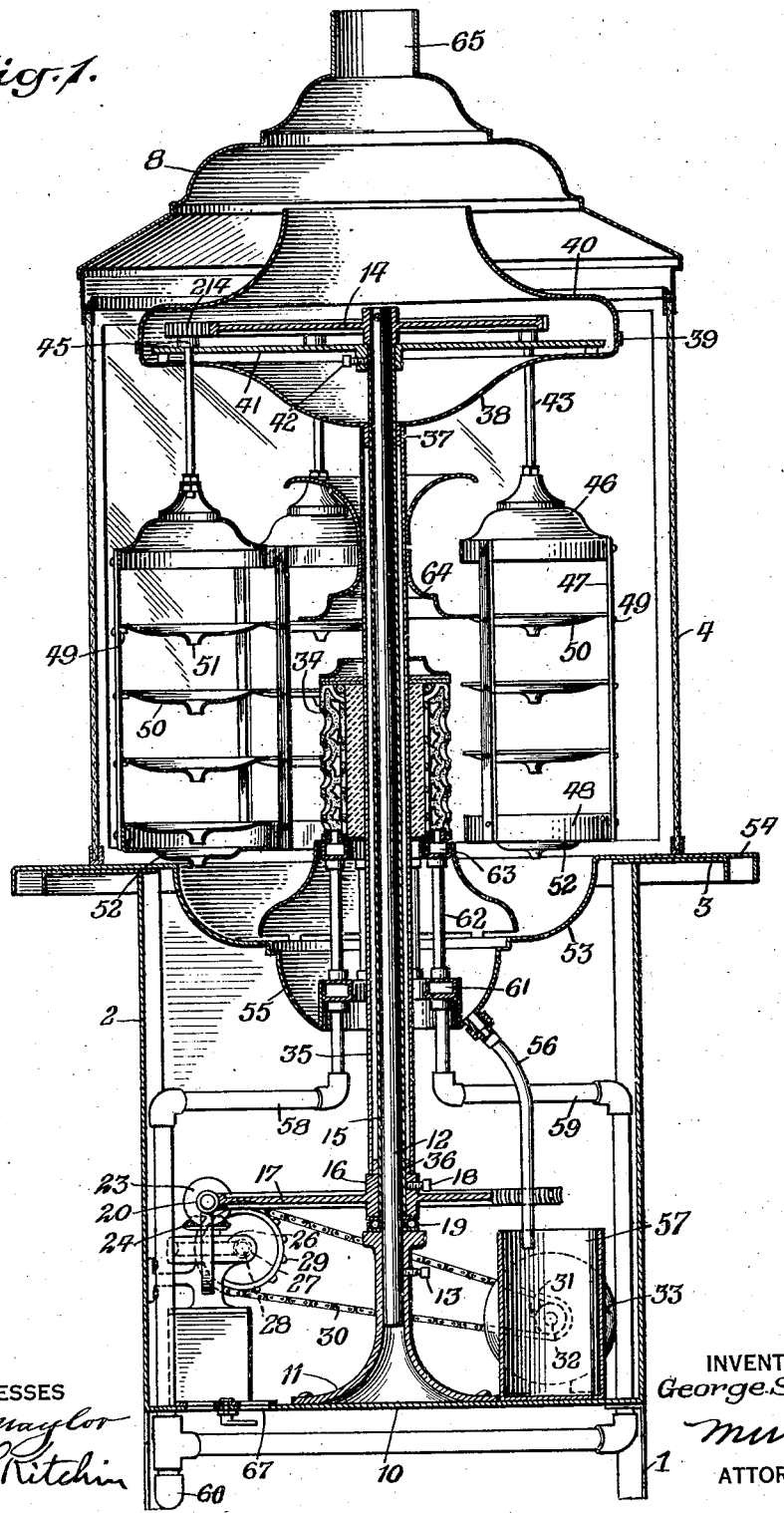

1,762,035

UNITED STATES PATENT OFFICE

GEORGE SOYLIAN, OF NEW YORK, N. Y.

REVOLVING BROILER

Application filed May 28, 1928. Serial No. 281,150.

This invention relates to devices for cooking food, particularly to an improved rotary broiler, wherein the different kinds of food may be properly cooked while being exposed to view.

Another object of the invention is to provide an improved form of broiler, wherein food to be cooked is carried by suitable supports and caused to rotate and also travel in a circle.

A further object is to provide an improved broiler wherein the articles being broiled are adapted to move in circles within plain view of anyone near the device; the arrangement being such that the articles being cooked may be unmolested until completely cooked, or may be basted from time to time.

Figure 1 is a longitudinal, vertical sectional view through a rotary broiler disclosing an embodiment of the invention;

Figure 2 is a side view of the broiler shown in Figure 1, the same being on a reduced scale;

Figure 3 is a sectional view through Figure 2 on the line 3—3; the same being on an enlarged scale;

Figure 4 is a sectional view through Figure 2 on the line 4—4;

Figure 5 is a fragmentary sectional view showing one of the rotating carriers disclosed in Figure 1.

Referring to the accompanying drawings by numerals, 1 indicates any desired number of supporting legs, there being four shown in the drawing. Connected with these legs is a lower casing 2 which is shown square, but, if desired, could be round or any other desired shape. The casing 2 and the legs 1 act as supports for what may be termed a platform 3 on which is mounted an upper casing 4. The lower casing 2 is preferably made of sheet metal and is rigidly secured in place, except the door 5, which is hingedly mounted at 6 and held normally closed by suitable lock 7. This lower casing contains certain mechanism hereinafter more fully described, while the upper casing contains other mechanism. The upper casing 4 is shown square, but may be made some other shape, if desired. The upper casing is provided with a top or hood 8 of sheet metal which is supported by the various side panels 9 of glass or other transparent material. Preferably glass or some other transparent material is used, though, if desired, sheet metal may be used on one side or entirely around the device without departing from the spirit of the invention. Transparent sides are preferable in order that purchasers may readily see the food cooked. As shown in Figure 1, the casing 2 is provided with a bottom 10 to which is secured a hollow base 11 carrying the rod 12 which is secured thereto in any desired manner, as for instance, by the set screw 13. This rod extends vertically upwardly to a point near the lower edge of the dome 8 and at the upper end is pinned or otherwise rigidly secured to a large gear wheel 14. In this way the gear wheel is supported and is held against rotation. A rotatable tube or sleeve 15 loosely surrounds rod 12 and extends into or through the hub 16 of the driving wheel 17. A set screw 18 locks the sleeve 15 to the hub 16 so that the sleeve will rotate with driving wheel 17. Suitable ballbearings or other bearings 19 are interposed between hub 16 and the top of base 11, whereby the parts freely and easily rotate. The wheel 17 is preferably a worm wheel and meshes with the worm 20, which worm is rigidly secured to shaft 21 carried in the bracket 22. A pinion 23 is rigidly secured to shaft 21 and meshes with the pinion 24 which in turn is rigidly secured to the shaft 25. A worm gear 26 is rigidly secured to shaft 25 and meshes with the worm 27, which worm in turn is rigidly secured to the shaft 28. A sprocket wheel 29 is rigidly secured to shaft 28 and accommodates the driving chain 30, which chain passes over the sprocket wheel 31 carried by the rotating shaft 32 of the electric motor 33. It will thus be seen that when power is turned on to the motor 33, the various parts just described will function and the power gear 17 will rotate. This rotation is rather slow by reason of the gearing set forth. This is desirable in order that the parts may move slowly around the burner 34.

An electric current may be conducted to the motor 33 in any desired manner and any suitable switch interposed in the circuit for permitting the current to be turned on and off. A tubular member 35 is connected through suitable bushings 36 and 37 to the sleeve 15, said connection being preferably by friction, though a stronger connection might be used, if desired. The bushing 37 is either formed integrally with or rigidly secured to a deflector 38, which connects at point 39 with a covering member 40 for producing a hood or casing for the gear wheel 14 and associated parts. As the gear 17 rotates sleeve 15 and tubular member 35 will rotate and will consequently turn casing 40 and the disk 41 which is rigidly secured to the sleeve 15 in any desired manner, as for instance, by the set screw 42. A number of shafts 43 extend through the deflector 38 and disk 41, each shaft carrying a pinion 44 having a hub 45 resting on the upper surface of disk 41. In the drawing five of these shafts 43 and associated parts are shown, but a greater or lesser number may be used without departing from the spirit of the invention. The respective pinions 44 continually mesh with the stationary gear 14, so that when the disk 41 rotates with sleeve 15 the various parts 43 will be moved in a circle and by reason of the meshing of the pinions 44 with gear wheel 14, the respective shafts 43 and parts connected therewith will rotate individually as they move in a circle. Each shaft 43 is rigidly bolted or otherwise secured to a hood 46. A plurality of vertical bars 47 are rigidly secured to each of the hoods 46 and each group of bars 47 carries a band 48 at the lower end, thus forming an individual rack or support. The respective bars 47 have a number of pins 49 on which are loosely placed supporting pans 50. Each of the pans 50 is provided with a drain outlet 51, whereby these pans will drain continually with the drainage from the upper pan dropping on the next lower pan and so on until the lowermost pan drain into the drain bottom 52 of the ring 48. The drain bottom 52 is formed with an opening for draining into the annular deflector 53. This deflector is provided with a horizontal portion 54 extending over the table or platform 3 and on which the lower part of the upper casing 4 rests. The grease and other drainage pass downwardly into the receptacle 55 and thence through the drain pipe 56 into the receptacle 57. In this way the drain is disposed of and also is conserved where it is desired to use this drain for basting purposes. Also, the drainage of one pan onto the next pan will act as an automatic basting for the lower articles of food. It will be understood that any desired article of food could be cooked by lying on the respective pans or trays 50, as for instance, chicken, beef, smoked sausage (hot dogs) and any other article of food which may be desired. The pans 50 may be readily removed, as they are preferably loosely placed in position, and consequently may be cleaned from time to time without trouble. Arranged at a convenient point centrally of the casing 4 is a gas heater 34 which may be of any desired kind, but is preferably tubular and surrounds the tube 35. This heater is supplied with gas from suitable pipes 58 and 59, said pipes receiving gas from the main supply pipe 60. If desired, a valve can be arranged in pipe 60 or in both the pipes 58 and 59 so as to control the flow of gas discharged into the annular retort 61. This annular chamber or retort has a number of pipes 62 connected therewith which lead the gas to the chamber 63 and this chamber discharges gas into the heater, which heater as above mentioned may be of any specific structure. If desired, instead of using a gas heater, an electric heater may be provided and the device will function in the usual manner. A heat deflector 64 is provided for directing the heat arising from the heater so that it will move laterally and heat certain of the upper pans 50 and associated parts. Any smoke or gaseous matter not burned will pass readily upward and finally out the discharge opening 65. The upper casing 4 is provided with a door 66 which is manually opened and closed, and thereby air is allowed to readily enter, but in order to provide a proper supply of air and a slight draft, a suitable damper is provided in door 5. In this way a proper amount of air is supplied to support combustion and smoke and objectionable gases are permitted to pass upwardly and out opening 65. In Figure 5 a slightly modified construction is disclosed wherein it will be noted that each of the rods 43' carries disks 68 and each disk carries a number of hooks 69 whereby articles of food 70 may be mounted on the hooks and thereby subjected to the heat from heater 34. In this form of the invention the rod 43' is connected with a single pan 71 at the bottom and at the top is connected by a set screw or other means to a sleeve 72 which is secured by pin 73 or other means to the stub shaft 74 connected with the gear wheel 44. If desired, all of the rods 43 and associated parts could be eliminated and structures similar to that shown in Figure 5 used, or some of the rods 43 and associated racks could be used and some of the supporting structures associated with rod 43' used. In all forms of the invention the food is completely enclosed and protected against dirt or other deleterious matter and at the same time is always in a position to be readily seen and inspected. Also, as the device operates each individual piece of food rotates with its individual support or rack and at the same time slowly moves in a circle around the heater or burner 34.

What I claim is:—

1. A revolving broiler, including a stationary standard, a gear wheel rigidly secured to said standard, a plurality of article supporting frames, a gear wheel connected with each of said frames, said gear wheels meshing with the first mentioned gear, means for supporting and moving said second mentioned gear in a circle while in mesh with the first mentioned gear, whereby said frames will be individually rotated as they move in a circle, said means extending to a point near the bottom of said standard, a driving structure connected with said means near the bottom of said standard, said driving structure including an electric motor and a heater arranged at the center of said circle for heating articles carried by said frames said heater surrounding said standard.

2. A revolving broiler, including a burner, a plurality of frames arranged in a circle around the burner, each of said frames having a series of vertically aligned superimposed removable trays and each tray being provided with a central drainage spout whereby the drainage from the upper trays will fall successively on the lower trays, means for directing the drainage from the lowermost drainage spout to a discharge point, and an enclosing housing protecting said frames and the articles carried thereby.

3. A revolving broiler, including a stationary standard, a rotatable tubular member surrounding said standard, means adjacent the base of the standard for rotating said tubular member, a disk rigidly secured to said tubular member at the upper end, a plurality of food-carrying frames, a rod extending from each of said frames through said disk, a pinion rigidly secured to said rod above said disk, whereby the rod and frames are supported by said disk, a large gear wheel rigidly secured to said standard and positioned to continually mesh with said pinions, whereby as said disk rotates said frames will move in a circle and will individually rotate, and a heater positioned to heat the articles carried by said frames.

4. In a broiler, a centrally-disposed heater, a rotatable tube extending centrally through said heater, a stationary standard extending through said tube, power means connected with said tube at the lower end thereof for rotating the tube, a gear wheel rigidly secured to said standard at the upper end thereof, a plate rigidly secured to said tube at the upper end thereof, a casing enclosing said plate and said gear, said casing being carried by said tube, a plurality of pinions continually meshing with the said gear, said pinions being supported by said plate, a shaft rigidly secured to each of said pinions, said shaft extending through said plate and casing downwardly, an article carrying frame secured to each of said shafts, said frames being arranged substantially opposite said heater, and means arranged below said carriers for receiving and guiding to a discharge point drainage from the carriers.

Signed at New York, in the county of Kings and State of New York this 19th day of May A. D. 1928.

GEORGE SOYLIAN.